United States Patent Office 2,769,837
Patented Nov. 6, 1956

2,769,837

3,5-DIISOPROPYLSALICYLAMIDE

Melville Sahyun and John A. Faust, Santa Barbara, Calif., assignors to Sahyun Laboratories, Santa Barbara, Calif., a corporation of California No Drawing. Application December 8, 1952, Serial No. 324,832

1 Claim. (Cl. 260—559)

This invention relates to 3,5-diisopropylsalicylamide and a process for its preparation.

The novel compounds of the present invention may be prepared by the ammonolysis of methyl 3,5-diisopropylsalicylate. The reaction is usually performed by reacting the ester and ammonia in the presence of a solvent, for example, methanol, ethanol, acetone, et cetera, and may be carried out at temperatures between zero and 100 degrees centigrade, preferably at room temperature. In place of the methyl ester, other alkyl esters, such as ethyl, propyl, butyl, amyl and hexyl esters may be substituted therefor. After completion of the reaction time, the amide may be separated by removing the solvent and excess ammonia from the reaction mixture and recrystallization from an alcohol-water solution. Isopropanol-water is preferred.

3,5-diisopropylsalicylamide has a melting point of 116–117 degrees centigrade, an appearance of colorless, non-hygroscopic platelets and a pH of 6.60 in a saturated solution.

*Example*

A mixture of 22.8 grams of methyl 3,5-diisopropylsalicylate and 200 milliliters of methanol, in a citrate bottle, was saturated with ammonia. After maintaining the temperature of the bottle at approximately room temperature for six days, the methanol and excess ammonia were removed by distillation, the residue consisting of a brown solid. Approximately 25 milliliters of isopropanol was added to the solid, the resulting solution clarified with charcoal, approximately fifty milliliters of water added, and the resulting crystals recovered. Sixteen and two-tenths (16.2) grams (76 percent of the theoretical yield) of colorless platelets, melting point 116–117 degrees centigrade, were obtained.

The 3,5-diisopropylsalicylamide of the present invention has shown a high degree of fungicidal activity. A dilution of 1:128,000–256,000 in Savoraud's Agar completely inhibited, in vitro, the growth of *Trichophyton Mentogrophytes*, whereas the same concentration of sodium undecylenate, a well-known fungastatic material, did not inhibit growth in this dilution.

Various modifications may be made in the method of the present invention, without departing from the spirit or scope thereof, and it is to be understood that we limit ourselves only as defined in the appended claim.

We claim:
3,5-diisopropylsalicylamide.

References Cited in the file of this patent

Nummy et al.: "JACS," vol. 73 (1951), pp. 1501, 1503.
Kline: "J. Chem. Education," vol. 19, July 1942, p. 332.
Mameli: "Gazz. Chim. Ital.," vol. 52, II (1922), pp. 185–88.